(12) United States Patent
Mizuta et al.

(10) Patent No.: US 8,124,869 B2
(45) Date of Patent: Feb. 28, 2012

(54) DYE-SENSITIZED TYPE SOLAR CELL

(75) Inventors: Keiichiro Mizuta, Akashi (JP); Junichi Nakamura, Takatsuki (JP)

(73) Assignee: Nippon Shokubai Co., Ltd., Osaka (JP)

( * ) Notice: Subject to any disclaimer, the term of this patent is extended or adjusted under 35 U.S.C. 154(b) by 912 days.

(21) Appl. No.: 10/756,271

(22) Filed: Jan. 14, 2004

(65) Prior Publication Data

US 2004/0163700 A1    Aug. 26, 2004

(30) Foreign Application Priority Data

Jan. 15, 2003    (JP) .................... 2003-007444

(51) Int. Cl.
*H01L 31/00* (2006.01)
(52) U.S. Cl. ..................................... 136/252
(58) Field of Classification Search .............. 136/263
See application file for complete search history.

(56) References Cited

U.S. PATENT DOCUMENTS

| | | | | |
|---|---|---|---|---|
| 5,273,840 A | * | 12/1993 | Dominey | 429/307 |
| 5,683,832 A | | 11/1997 | Bonhote et al. | |
| 6,294,289 B1 | | 9/2001 | Fanta et al. | 429/188 |
| 6,333,425 B1 | * | 12/2001 | Michot et al. | 558/167 |
| 6,376,765 B1 | * | 4/2002 | Wariishi et al. | 136/263 |
| 2002/0040728 A1 | * | 4/2002 | Yoshikawa | 136/263 |
| 2002/0055046 A1 | * | 5/2002 | Ono et al. | 429/324 |

FOREIGN PATENT DOCUMENTS

| | | |
|---|---|---|
| EP | 0 718 288 A | 6/1996 |
| JP | 2000-508677 A | 7/2000 |
| JP | 2002-075442 A | 3/2002 |
| JP | 2002-523879 A | 7/2002 |
| JP | 2004-175667 A | 6/2004 |
| WO | 00/11742 | 3/2000 |

OTHER PUBLICATIONS

D.R. MacFarlane, S.A. Forsyth, J. Golding and G.B. Deacon, "Ionic liquids based on imidazolium, ammonium and pyrrolidinium salts of the dicanamide anion", Green Chemistry 4, 444-448 (2002).*
Massey, Film Properties of Plastics and Elastomers, © 2004, Plastics Design Library, p. 206.*

(Continued)

*Primary Examiner* — Alexa Neckel
*Assistant Examiner* — Miriam Berdichevsky
(74) *Attorney, Agent, or Firm* — Sughrue Mion, PLLC (57) ABSTRACT

The present invention provides a dye-sensitized solar cell of high safety, of improved ionic conductivity, and, therefore, of excellent cell performance.

The present invention is related to a dye-sensitized solar cell comprising an ionic substance having an anion represented by the following general formula (1):

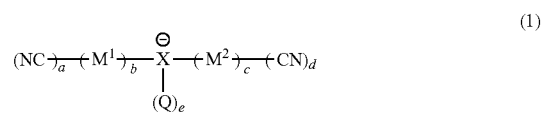

(1)

(wherein X represents at least one element selected from among B, C, N, O, Al, Si, P, As, and Se. $M^1$ and $M^2$ are the same or different and each represents an organic linking group. Q represents an organic group. a is an integer of not less than 1, and b, c, d, and e each is an integer of not less than 0).

1 Claim, 4 Drawing Sheets

OTHER PUBLICATIONS bonhote, P., Dias, A-P., Papageorgiou, N., Kalyanasundaram, K. And Gratzel, M., Hydrophobic, highly conductive ambient temperature molten salts, 1996, Inorganic Chemistry, 35, 1168-1178.*

Nobuyuki Koura et al, Polyaniline Secondary Cells with Ambient Temperature Molten Salt Electrolytes; J. Electrochem. Soc, vol. 140, No. 3, Mar. 1993, pp. 602-605.

C.A. Angell et al., Rubbery solid electrolytes with dominant cationic transport and high ambient conductivity; Nature, vol. 362, Mar. 11, 1993, pp. 137-139.

"Latest Technologies relating to Dye-sensitized solar cells", May 25, 2001, pp. 92-93.

Peng Wang et al, A new Ionic Liquid Electrolyte Enhances the Conversion Efficiency of Dye-Sensitized Solar Cells; J. Phys. Chem. B. 2003, 107. 13280-13285.

N. Papageorgiou et al, The Performance and Stability of Ambient Temperature Molten Salts for Solar Cell Applications, J. Electrochem. Soc., vol. 143, No. 10, Oct. 1996.

Douglas R. Macfarlene et al, Low Viscosity Ionic Liquids Based on Organic Salts of the Dicyanamide Anion, Chem. Commun., 2001, pp. 1430 and 1431.

MacFarlane, D. R. et al.; "Ionic liquids based on imidazolium, ammonium and pyrrolidinium salts of the dicyanamide anion", Green Chemistry, The Royal Society of Chemistry, vol. 4, No. 5, Jan. 1, 2002; pp. 444-448.

* cited by examiner

DYE-SENSITIZED TYPE SOLAR CELL

TECHNICAL FIELD

The present invention relates to dye-sensitized solar cells. More particularly, it relates to a dye-sensitized solar cell comprising a molten salt as its charge transfer layer (electrolyte).

PRIOR ART

Figure 7:
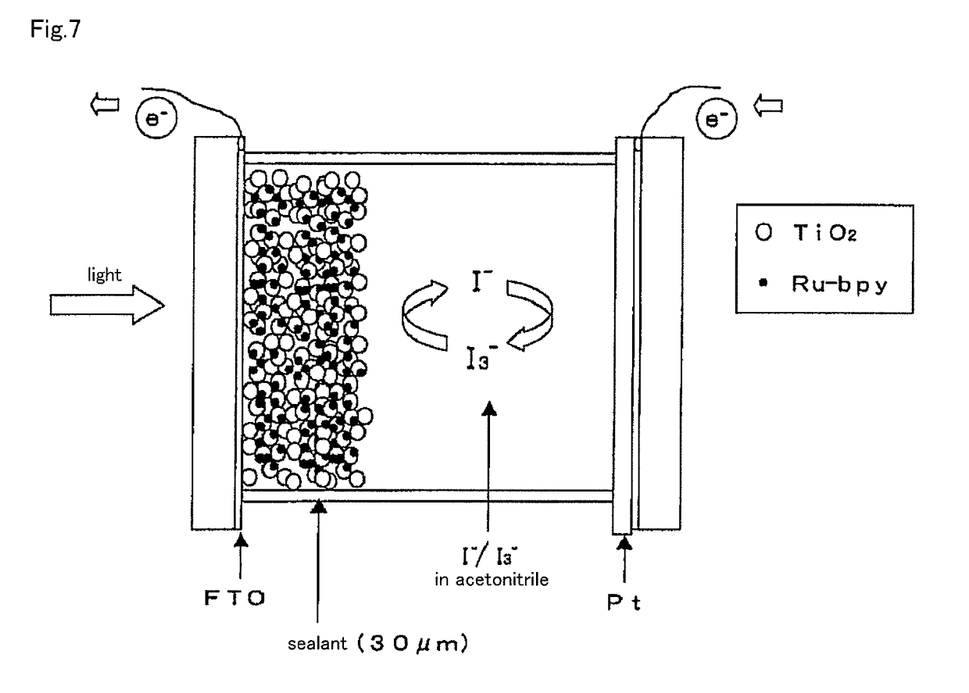
FIG. 7 is a schematic view showing a portion (photo-electric energy conversion device) of an example the conventional dye-sensitized solar cell.

Recent solar cells are sealed cell structures and, among these, the dye-sensitized solar cell equipped with a semiconductor layer (photosensitive layer) which comprises a photosensitive substance such as titanium dioxide carrying a photosensitizing dye as adsorbed thereon is attracting attention because of its high photo-electric energy conversion efficiency. The dye-sensitized solar cell, for example of the construction illustrated in FIG. 7, comprises a conductive support, such as Fluorine-doped Tin Oxide(FTO), a photosensitive layer (a semiconductor layer containing a photosensitive substance) which contains a finely divided semiconductor such as $TiO_2$ particles sensitized by a dye such as ruthenium-2,2-bipyridine (Ru-bpy), a charge transfer layer comprising an electrolysis solvent, such as acetonitrile, and an electrolyte, such as iodine, a counter electrode made of a metal such as platinum (Pt), and a sealant sealing the electrolyte solution. The operating principle of this structure is that sunlight incident from the conductive support side or the counter electrode side causes the semiconductor layer containing a photosensitive substance to release electrons under the influence of the photosensitizing dye and the redox pair $I^-/I_3^-$ in the charge transfer layer acts on the counter electrode to output electric energies.

Such solar cells use an organic solvent as the electrolysis solvent and, partly because of the drawback that the ready volatility and flash point of the solvent call for hermetic sealing and partly because of the high incidence of leakage leading to lack of long-term reliability and deficiencies in safety, there has been a standing demand for a constituent material with which such drawbacks could be overcome.

Under the circumstances the application of a room temperature-melting salt which is liquid at room temperature is under investigation (cf. Koura et al.: J. Electrochem. Soc., 1993, 140, p. 602, for instance). The room temperature-melting salt so far known includes the complex of a halide of an aromatic quaternary ammonium compound, such as N-butylpyridium or N-ethyl-N'-methylimidazolium, with an aluminum halide and the mixture of two or more different lithium salts (cf. C. A. Angell et al.; Nature, 1933, 362, p. 137, for instance). However, the former complex presents with corrosion problems due to halide ions while the latter is a supercooled liquid which is thermodynamically unstable and, hence, presents with the problem of solidification with the lapse of time.

On the other hand, the imidazolium or pyridinium salt of tetrafluoroborate anion and bistrifluoromethanesulfonylimide anion, are electrically comparatively stable and have, therefore, been under intensive study in recent years and attempts have been made to use a bistrifluoromethanesulfonylimide anion-containing compound as the constituent material of the charge transfer layer of a solar cell (cf. Arakawa Hironori (ed.): Latest Technologies relating to Dye-sensitized solar cells, CMC, May 25, 2001, p. 93, for instance). However, these are deficient in ionic conductivity and other performance characteristics and, moreover, since they contain fluorine, electrode corrosion and other problems are inevitable. Thus, there is room for contrivance for providing a dye-sensitized solar cell possessing excellent basic performance.

Meanwhile, in connection with N-alkyl-N-methylpyrrolidium or 1-alkyl-3-methylimidazolium dicyanamide salts, studies were undertaken on thermal characteristics, viscosity and qualitative electric potential stability and it was disclosed that such dicyanamide salts are of use as low-viscosity ionic liquids (cf. Douglas R. MacFarlane and 4 others: Chem. Commun., 2001, p. 1430-1431, for instance).

Referring to cyano-substituted salts including salts of cyano-substituted methides and amides, an electrolyte comprising a matrix material and at least one salt selected from the group consisting of N-cyano-substituted amides, N-cyano-substituted sulfonamides, 1,1,1-dicyano-substituted sulfonylmethides and 1,1,1-dicyanoacylmethides and a matrix material have been disclosed (cf. Japanese Kohyo Publication 2002-523879 (pp. 1-7), for instance). Furthermore, referring to ionic compounds containing an anionic moiety binding to the cationic moiety $M^{+m}$, it has been disclosed that a compound such that M in the cationic moiety is hydroxonium, nitrosonium $NO^+$, ammonium $NH_4^+$, a metal cation having a valence number of m, an organic cation, or an organometal cation and the anionic moiety corresponds to one of the formula $R_D$—Y—$C(C\equiv N)_2^-$ or Z—$C(C\equiv N)_2^-$ can be used in the preparation of ion conductive materials [cf. Japanese Kohyo Publication 2000-508677. (pp. 1-12), for instance].

However, none of these technologies have been shown to be applicable to the charge transfer layer of a dye-sensitized solar cell, and there is room for contrivance for providing a dye-sensitized solar cell not requiring a hermetic seal around the charge transfer layer and, hence, of high safety through substitution of a novel vehicle for the conventional electrolysis solvent such as acetonitrile in the charge transfer layer.

SUMMARY OF THE INVENTION

Accordingly, it is an object of the present invention, which has been made in view of the above-mentioned state of the art, to provide a dye-sensitized solar cell of high safety, of improved ionic conductivity, and, therefore, of excellent cell performance.

In the course of their extensive investigation of electrolysis solvents which may be used in the charge transfer layer of a dye-sensitized solar cell, the inventors of the present invention found that the need for hermetic sealing can be eliminated and, hence, a high level of safety be assured by using a molten salt which has no flash point unlike the electrolyte using an organic solvent having a flash point, such as acetonitrile, which is currently in use.

The inventors found that by using an inonic substance with a defined anion structure as the molten salt, the decreased viscosity of the electrolyte in the charge transfer layer as compared with the use of a molten salt in constitution of the conventional solar cell enables them to provide a dye-sensitized solar cell with enhanced ionic conductivity, and, hence, improved cell performance, thus accomplishing the above object. Based on these findings, the present invention has now been completed.

Thus, the present invention provides a dye-sensitized solar cell comprising an ionic substance having an anion represented by the following general formula (1):

(wherein X represents at least one element selected from among B, C, N, O, Al, Si, P, As, and Se. $M^1$ and $M^2$ are the same or different and each represents an organic linking group. Q represents an organic group. a is an integer of not less than 1, and b, c, d, and e each is an integer of not less than 0).

DETAILED DESCRIPTION OF THE INVENTION

The present invention is now described in detail.

The dye-sensitized solar cell of the present invention is composed of a photo-electric energy conversion device comprising a conductive support, a semiconductor layer having a photosensitive substance (hereinafter referred to sometimes as a photosensitive layer), a charge transfer layer comprising an electrolyte, and a counter electrode, which photo-electric energy conversion device is connected to an external circuit for operation, and as a component material of the dye-sensitized solar cell, an ionic substance having an anion represented by the above general formula (1) is used, preferably as a component material of the electrolyte in the charge transfer layer.

The electrolyte for use in the above charge transfer layer is usually composed of a redox-forming substance and an electrolysis solvent as essential components and as the electrolysis solvent, the above-mentioned ionic substance having an anion represented by the above general formula (1) is preferably used. In this connection, while a liquid electrolyte is preferably used for the charge transfer layer of the present invention, it may be used as a solid or gel electrolyte by adding a polymer or the like to the above-mentioned component material of the electrolyte. When the gel electrolyte is used, the method to produce the gel electrolyte may be (1) addition of oil gelling agent (2) polymerization of monomer(s) (inclusive of polyfunctional monomer(s)) (3) addition of polymer (4) crosslinking reaction of polymer, and so forth.

The ionic substance having an anion-represented by the above general formula (1) need only be a molten salt that can be used as the electrolysis solvent for the electrolyte in the charge transfer layer, and is preferably a compound containing an anion represented by general formula (1) and a proton, an organic salt of the anion represented by general formula (1), or an inorganic salt of the anion represented by general formula (1). The term "molten salt" as used herein means a salt which may stably retain a liquid state preferably within the temperature range of room temperature to 80° C.

The minimum level of the ionic substance having an anion represented by the above general formula (1) is not particularly restricted but, taking the amount of the electrolyte as 100 mass %, the amount of the ionic substance is preferably not less than 1 mass %. The maximum level of the ionic substance is preferably not more than 99 mass %. More preferably, not less than 10 mass % but not more than 90 mass %. Any amount less than 10 mass % will lead to a decrease in ionic conductivity, while exceeding 90 mass % results in a deficiency in the redox-forming substance, so that a dye-sensitized solar cell having a satisfactory performance may not be constituted. The more preferred content is not less than 20 mass % and not more than 80 mass %.

Referring to the anion represented by the above general formula (1), X represents at least one element selected from among B, C, N, O, Al, Si, P, As, and Se but is preferably C or N. Q represents an organic group and is preferably a hydrogen atom, a halogen atom, $C_pF_{(2p+1-q)}H_q$, $OC_pF_{(2p+1-q)}H_q$, $SO_2 C_pF_{(2p+1-q)}H_q$, $CO_2 C_pF_{(2p+1-q)}H_q$, or $SO_3C_6F_{5-r}H_r$, $NO_2$ (wherein $1 \leq p \leq 6$, $0 < q \leq 13$, $0 < r \leq 5$), for instance, more preferably a fluorine atom, a chlorine atom, $C_pF_{(2p+1-q)}H_q$, or $SO_2 C_pF_{(2p+1-q)}H_q$. $M^1$ and $M^2$ may be the same or different and each independently represents an organic linking group selected from among —S—, —O—, —SO$_2$—, and —CO—, preferably —SO$_2$—, or —CO—. The symbol a is an integer of not less than 1, and the symbols b, c, d, and e each is an integer of not less than 0, with a, d, and e being dependent on the valence number of the element X; for example where X=N, (1) a=2, d=0 and e=0, (2) a=1, d=1, and e=0, or (3) a=1, d=0, and e=1.

The anion represented by the above general formula (1) is preferably an anion of general formula (1) wherein e is equal to 0, that is to say an anion represented by the general formula (2) represented below, more preferably tricyanomethylide anion or dicyanamide anion. Moreover, the anion represented by the general formula (3) shown below and the anion represented by the general formula (4) shown below are also among the preferred anions.

The organic salt of the anion represented by the above general formula (1) is preferably an onium salt of anion represented by the general formula (1), particularly preferably the organic salt formed with the above-mentioned onium cation.

Suitable as the above-mentioned onium cation are onium cations represented by the following general formula (5);

wherein L represents C, Si, N, P, S or O, the R groups may be the same or different and each is an organic group or may be bonded together, and s is 3, 4 or 5 and is a value determined by the valency of the element L. Specifically, onium cations represented by the following general formula;

wherein the R groups are as defined in the general formula (5), are preferred. Such onium cations may be used singly or two or more of them may be used in combination.

Among these, the following onium cations are preferred;

(1) Eleven heterocyclic onium cations represented by the following general formula;

(2) Five unsaturated onium cations represented by the following general formula;

(3) Nine saturated ring onium cations represented by the following general formula;

In the above-mentioned general formulas, $R^1$ to $R^{12}$ are the same or different and each is an organic group and two of them may be bonded together.

(4) Linear onium cations in which R is a $C_1$-$C_8$ alkyl group.

More preferred among such onium cations are those in which L in the general formula (5) is a nitrogen atom. Still more preferred are four onium cations represented by the following general formula;

wherein $R^1$ to $R^{12}$ are as defined above. Most preferred is N-alkyl-N'-alkylimidazolium cation.-

The organic group represented by each of $R^1$ to $R^{12}$ mentioned above is preferably a hydrogen atom, a fluorine atom, an amino, imino, amide, ether, ester, hydroxyl, carboxyl, carbamoyl, cyano, sulfone or sulfide group or a straight, branched or cyclic $C_1$-$C_{18}$ hydrocarbon group or fluorocarbon group, which may comprising a nitrogen, oxygen, sulfur or like atom or atoms. More preferred are a hydrogen atom, a fluorine atom, a cyano group, a sulfone group, and $C_1$-$C_8$ hydrocarbon group.

The inorganic salt of the anion represented by the above general formula (1) is preferably an alkaline metal salt and/or alkaline earth metal salt of anion represented by the above general formula (1), more preferably the lithium salt. The preferred species of the above-mentioned lithium salt includes not only lithium salts of the preferred anions mentioned above but also $LiC(CN)_3$, $LiSi(CN)_3$, $LiB(CN)_4$, $LiAl(CN)_4$, $LiP(CN)_2$, $LiP(CN)_6$, $LiAs(CN)_6$, among others.

The electrolysis solvent for use in the above-mentioned charge transfer layer may include other compounds in addition to the ionic substance having an anion represented by the above general formula (1), and suitable examples of the above other compounds are organic compounds having a halide anion (fluoro anion, chloro anion, bromo anion, iodo anion), tetrafluoroborate anion, hexafluorophosphate anion, hexafluoroarsenate anion, sulfonylimide anion represented by the general formula (6) presented below, sulfonylmethide anion represented by the general formula (7) presented below, or an organic carboxylate anion (the anion of acetic acid, trifluoroacetic acid, phthalic acid, maleic acid, benzoic acid or the like) and an onium cation.

(6)

(7)

Referring to the above general formula (6) and general formula (7), $R^{13}$, $R^{14}$, and $R^{15}$ may be the same or different and each represents a $C_{1-4}$ perfluoroalkyl group which may optionally have one or two ether groups.

The electrolysis solvent for use in the above charge transfer layer may comprise a hydrous solvent or an organic solvent within the range not adversely affecting the performance of the dye-sensitized solar cell according to the present invention but is preferably one not comprising such a solvent. The organic solvent includes, to mention some preferred examples, various carbonate compounds such as dimethyl carbonate, diethyl carbonate, methyl ethyl carbonate, ethylene carbonate, propylene carbonate, etc.; ester compounds such as methyl acetate, methyl propionate, gamma-butyrolactone, etc.; ether compounds such as diethyl ether, 1,2-dimethoxyethane, 1,3-dioxosilane, tetrahydrofuran, 2-methyltetrahydrofuran, etc.; heterocyclic compounds such as 3-methyl-2-oxazolidinone, 2-methylpyrrolidone, etc.; nitrile compounds such as acetonitrile, methoxyacetonitrile, propionitrile, etc.; and aprotic polar compounds such as sulfolane, dimethyl sulfoxide, dimethylformamide, etc., and these may be used each independently or in a combination of two or more species. Among these, carbonate compounds such as ethylene carbonate, propylene carbonate, etc.; heterocyclic compounds such as 3-methyl-2-oxazolidinone, 2-methylpyrrolidone, etc.; and nitrile compounds such as acetonitrile, methoxyacetonitrile, propionitrile, etc. are particularly preferred. Organic acids such as formic acid, acetic acid may be added to the electrolyte.

The redox-forming substance for use in the electrolyte according to the present invention need only be a redox-forming pair of an oxidized substance and a reduced substance but is preferably a redox pair of oxidized and reduced substances having the same electric charge. The term "redox-forming substance" means a pair of substances existing reversibly in oxidized and reduced forms.

The preferred redox-forming substance mentioned above includes a chlorine compound-chlorine, an iodine compound-iodine, a bromine compound-bromine, thallium ion (III)-thallium ion (I), mercury ion(II)-mercury ion (I), ruthenium ion (III)-ruthenium ion (II), copper ion (II)-copper ion (I), iron ion (III)-iron ion (II), vanadium ion (III)-vanadium ion (II), manganate ion-permanganate ion, ferricyanide-ferrocyanide, quinone-hydroquinone, and fumaric acid-succinic acid. Among these, an iodine compound-iodine system is preferred. The preferred iodine compound includes metal iodides such as lithium iodide, potassium iodide, etc.; quaternary ammonium iodide salt compounds such as tetralkylammonium iodides, pyridinium iodides, etc.; and diimidazolium iodide compounds such as dimethylpropylimidazolium iodide, and so forth.

Although not absolutely critical, the proportion of the above redox-forming substance is preferably not less than 10 mass % and not more than 90 mass %, based on 100 mass % of the electrolyte. If the amount is less than 10 mass %, no sufficient electric energy output may be obtained. The other way round, if it exceeds 90 mass %, the amount of the electrolysis solvent will be too small to provide a dye-sensitized solar cell having excellent performance. The more preferred proportion is not less than 20 mass % and not more than 50 mass %.

The preferred form of electrolyte for the dye-sensitized solar cell according to the present invention is the form in which the mixture of the ionic substance having an anion represented by the above general formula (1) and the redox-forming substance has a viscosity of not more than 300 mPa·s. If the viscosity of the above mixture exceeds 300 mPa·s, no sufficient improvement may be obtained in ionic conductivity. The viscosity is preferably not more than 200 mPa·s, more preferably not more than 100 mPa·s.

The method of measuring the viscosity mentioned above is not particularly restricted but the method involving the use of Model TV-20 viscometer cone/plate type (manufactured by Tokimec Inc.) at 25° C. is preferred.

An example of the photo-electric energy conversion device comprising the dye-sensitized solar cell of the present invention is now described referring to FIGS. 1~6.

Referring to FIGS. 1~6 which are sectional views of photo-electric energy conversion devices generally comprising a conductive layer, a photosensitive layer, a charge transfer layer, and a counter electrode conducting layer as laminated in the order mentioned, the photosensitive layer comprises dye-sensitized semiconductor particles and a charge-transporting material penetrating into the clearances between the semiconductor particles. The charge-transporting material is composed of the same material as used in the charge transfer layer. For imparting strength to the dye-sensitized solar cell, a substrate may be provided on the conductive layer and/or counter electrode conducting layer side. In this specification, the layer comprising the conductive layer and the optional substrate is referred to as the "conductive support" and the layer comprising the counter electrode conducting layer and optional substrate is referred to as the "counter electrode". While the artifact fabricated by connecting such photo-electric energy conversion devices to an external circuit to perform a work is a dye-sensitized solar cell, the sides of the device are preferably sealed with a polymer, an adhesive, or the like to prevent degradation of the constituent materials and evaporation of the contents. Referring, further, to FIGS. 1~6, conductive layer, counter electrode conducting layer and substrate may be a transparent conductive layer, a transparent counter electrode conducting layer, and a transparent substrate, respectively.

The dye-sensitized solar cell of the present invention can be used in various applications by tailoring the internal structure of the photo-electric energy conversion device to the intended use. The internal structure can be roughly divided into two types, namely the structure on which light is incident from both sides and the structure on which light is incident from one side only.

In the photo-electric energy conversion device illustrated in FIGS. 1~6, the light incident on the photosensitive layer comprising dye-sensitized semiconductor particles excites the dye etc. and the high-energy electrons in the excited dye etc. are delivered to the conduction zones of the semiconductor particles and diffuse to the conductive layer. In the course the dye and other molecules are in the oxidized form. In a photoelectrochemical cell, the electrons in the conductive layer perform the work in an external circuit as they pass through the counter electrode conducting layer and charge transfer layer and finally return to the oxidized dye etc. to regenerate the dye. The photosensitive layer acts as the negative electrode. At the boundaries between the respective layers (for example, the boundary between the conductive layer and photosensitive layer, the boundary between the photosensitive layer and charge transfer layer, and the boundary between the charge transfer layer and counter electrode conducting layer), the components of the respective layers may have been intermingled by diffusion.

Figure 1:
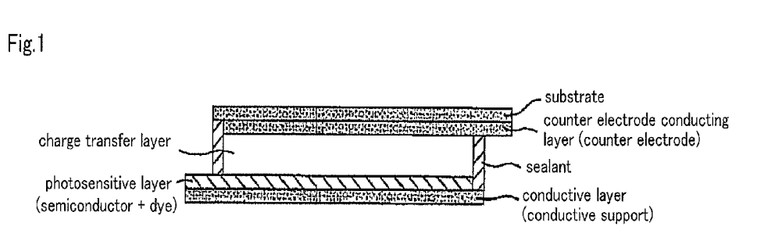
FIG. 1 is a cross-sectional view showing a portion (photo-electric energy conversion device) of an example of a dye-sensitized solar cell of the present invention.
Figure 2:
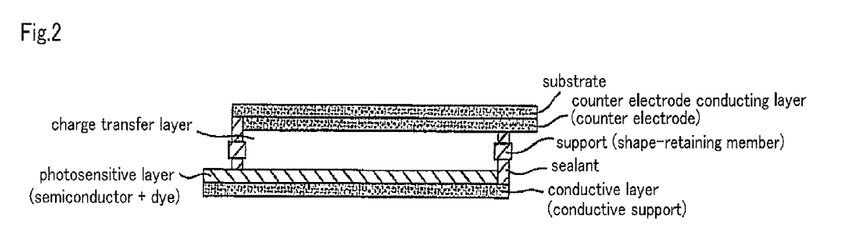
FIG. 2 is a cross-sectional view showing a portion (photo-electric energy conversion device) of an example of a dye-sensitized solar cell of the present invention.
Figure 3:
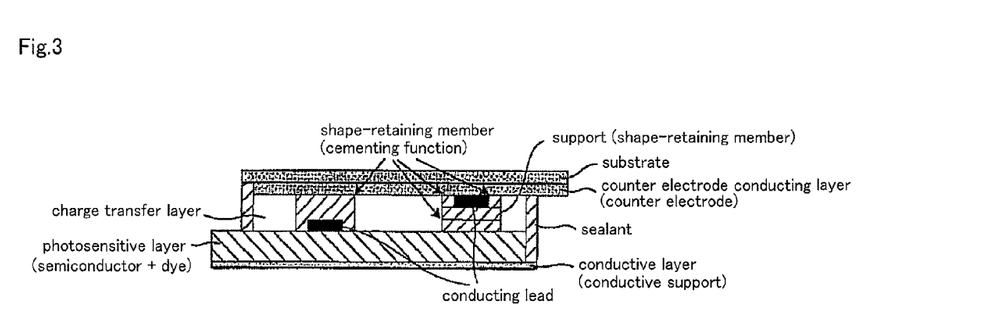
FIG. 3 is a cross-sectional view showing a portion (photo-electric energy conversion device) of an example of a dye-sensitized solar cell of the present invention.
Figure 4:
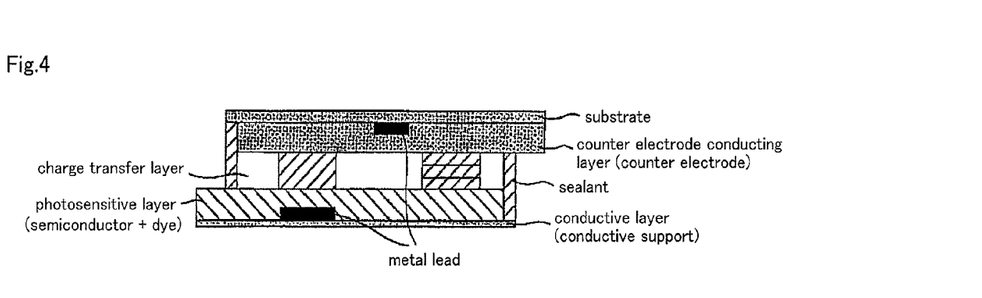
FIG. 4 is a cross-sectional view showing a portion (photo-electric energy conversion device) of an example of a dye-sensitized solar cell of the present invention.
Figure 5:
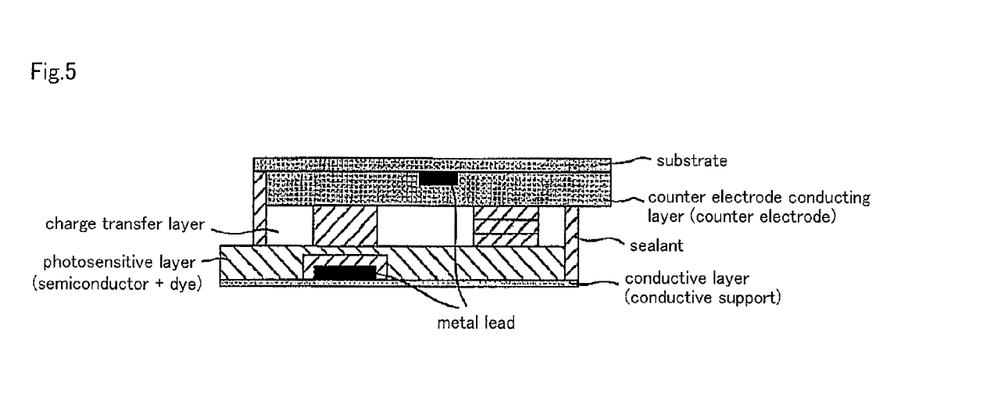
FIG. 5 is a cross-sectional view showing a portion (photo-electric energy conversion device) of an example of a dye-sensitized solar cell of the present invention.
Figure 6:
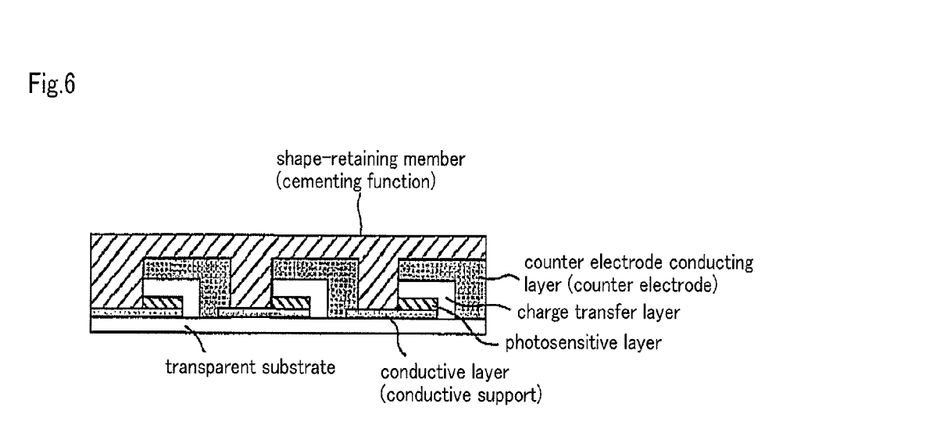
FIG. 6 is a cross-sectional view showing a portion (photo-electric energy conversion device) of an example of a dye-sensitized solar cell of the present invention or a partial sectional view showing an example of substrate-integrated solar cell modular structure utilizing the photo-electric energy conversion device of the present invention.

FIGS. 1 and 2 show the structure in which a photosensitive layer and a charge transfer layer are interposed between the conductive layer (conductive support) and counter electrode conducting layer, with a substrate being superposed on the counter electrode conducting layer to form a counter electrode. FIGS. 3, 4, and 5 show the structure in which a photosensitive layer, a charge transfer layer, and a counter electrode conducting layer are disposed in the order mentioned on a conductive layer (conductive support), with a substrate being further superposed and a shape-retaining member (support) being used for gap maintenance. In FIG. 3, conducting leads are partly disposed in the charge transfer layer and sealed with a conductor covering material. In FIG. 4, metal leads are partly disposed on the conductive layer (in the photosensitive layer) and in the counter electrode conducting layer. In FIG. 5, metal leads are partly disposed on the conductive layer (in the photosensitive layer) and in the counter electrode conducting layer, with the metal lead in the photosensitive layer being sealed with a conductor covering material. In FIGS. 1~5, the charge transfer layer is sealed with a sealant and, as the conductive layer, counter electrode conducting layer, and substrate, transparent members are used so that light may incident on the device from one side or both sides. The structure shown in FIG. 6 has a transparent conductive layer on one side of a transparent substrate and, as further superposed thereon, a cell comprising a photosensitive layer, a charge transfer layer and a counter electrode conducting layer is disposed as a modular unit and a plurality of such modular units constituting a solar cell are fixed in position on the transparent substrate by a shape-retaining member playing the role of a cement. Referring, further, to FIG. 6, an antireflection layer (not shown) may be disposed on the other side of the transparent substrate. In such a construction, the area ratio of the photosensitive layer (the area ratio as viewed from the substrate side on which light is to be incident) is preferably increased to enhance the utilization efficiency of incident light. Optionally, the structures illustrated in FIGS. 1~6 may be used in combination.

The term "sealant" mentioned above is used herein to mean a sealing material for preventing leakage of the materials constituting the charge transfer layer as a cover for the cell constituent materials, particularly for preventing infiltration of iodine, the solvent, such as water, etc. in the charge transfer layer, or a sealing member for reinforcing the peripheral edge of the conductive support and other components. The term "shape-retaining member" means a support (spacer) for maintaining gaps or a shape-retaining member for shape retention of modules (a cementing function). The term "conductor covering material" means a material used for sealing conducting (metal) leads in the sealed cell or sealing (insulating) the metal wiring (current collector wiring) which is required for a large-area format.

Preferred for the above sealant, shape-retaining member, and conductor covering material includes curable resins such as radical-curable resin, ion-curable resin and thermosetting resin.

As the radical-curable resin mentioned above, resins comprising a polymer having radical curability (hereinafter sometimes referred to as radical-curable polymer), such as an unsaturated polyester, epoxy (meth)acrylate, urethane (meth)acrylate, polyester (meth)acrylate, or the like, and a reactive diluent and resins inclusive of a (meth)acrylic syrup comprising a reactive diluent are preferably used. Aside from these, resins comprising a polymer having no radical curability, such as a saturated polyester or a polymethyl (meth)acrylate, and a reactive diluent are also preferred. In the case of a radical-curable resin having an aromatic ring, the polymer having radical-curability or the polymer having no radical curability may contain an aromatic ring or the reactive diluent may have an aromatic ring.

As the ion-curable resin mentioned above, resins having a structure having an epoxy group, a vinyl ether group, an oxetane group, or an isopropenyl ether group at the terminus of the main chain and/or side chain are preferably used and, among such resins, epoxy resins are preferred.

The thermally curable resin (thermosetting resin) mentioned above is preferably an epoxy resin and/or a polyphenol.

The constitutent layers of the photo-electric energy conversion device are now described in detail.

(1) The Conductive Support

The conductive support mentioned above may contain a single electrically conducting layer (1-1) or a bilayer artifact containing a conductive layer and a substrate (1-2). However, when a conductive layer having sufficient strength and hermetic sealability is used, the substrate need not necessarily be provided. In the case of (1-1), a metallic material having sufficient strength and electric conductivity, for instance, is used as the conductive layer. In the case of (1-2), a substrate having a conductive layer comprising a conductive agent on the photosensitive layer side is used. The preferred conductive agent is a metal such as platinum, gold, silver, copper, aluminum, rhodium or indium; carbon; a conductive metal oxides such as indium-tin composited oxide, fluorine-doped tin oxide, or the like. The preferred thickness of the conductive layer is about 0.02~about 10 μm.

The conductive support mentioned above is preferably one having as low a surface resistivity as possible. The surface resistivity value is preferably not more than 100 $\Omega/\square$, more preferably not more than 10 $\Omega/\square$. The preferred lower limit of surface resistivity is about 0.1 $\Omega/\square$.

In the case where light is to be incident from the conductive support side, the support is preferably substantially transparent. The term "substantially transparent" means that the light transmittance is not less than 10%, preferably not less than 50%, more preferably not less than 70%.

The transparent conductive support mentioned above is preferably a transparent support containing a transparent substrate made of glass, a plastic or the like and, as formed on the surface thereof by coating or vapor deposition, a transparent conductive layer made of a conductive metal oxide. The particularly preferred support is a conductive glass sheet comprising a transparent substrate made of low-cost soda-lime float glass and, as built thereon, a conductive layer made of fluorine-doped tin dioxide. Moreover, in order to provide a flexible dye-sensitized solar cell at low cost, it is preferable to use a support comprising a transparent polymer film formed with a conductive layer. The preferred material of the transparent polymer film includes tetraacetylcellulose (TAC), polyethylene terephthalate (PET), polyethylene naphthalate (PEN), syndiotactic polystyrene (SPS), polyphenylene sulfides (PPS), polycarbonates (PC), polyarylates (PAr), polysulfones (PSF), polyestersulfones (PES), polyetherimides (PEI), cyclic polyolefins, brominated phenoxy polymers, and other resins. To provide for sufficient transparency, the coating amount of the conductive metal oxide is preferably within the range of 0.01~100 g per $m^2$ of the glass or plastic support.

In the present invention, metal leads are preferably used for the purpose of lowering the resistance of the transparent conductive support. The preferred material of the metal leads includes such metals as aluminum, copper, silver, gold, platinum, nickel, etc., and aluminum or silver is particularly preferred. Suitably, the metal leads are formed on the transparent substrate by vapor deposition, sputtering or other technique and a transparent conductive layer comprising a fluorine-doped tin oxide or ITO film is then disposed thereon. It is also preferred to construct a transparent conductive layer on a transparent substrate and dispose metal leads on the transparent conductive layer. The decrease in incident light quantity due to installation of metal leads should be preferably within 10%, more preferably within the range of 1-5%.

(2) A Semiconductor Layer Having a Photosensitive Substance (Photosensitive Layer)

In the dye-sensitized solar cell of the present invention, the photosensitive layer preferably comprises dye-sensitized semiconductor particles. The semiconductor acts as the so-called photosensitive substance which absorbs light to undergo charge separation giving rise to electrons and positive holes. In the dye-sensitized semiconductor particles, the absorption of light and consequent generation of electrons and positive holes occur mostly in the dye and the semiconductor particles play the role of accepting and transporting the electrons.

As said semiconductor particles, simple semiconductors such as silicon, germanium, etc.; III-V compound semiconductors; metal chalcogenides such as oxides, sulfides, selenides, etc.; and compounds having the perovskite structure, such as strontium titanate, calcium titanate, sodium titanate, barium titanate, potassium niobate, etc. are preferably used. Among these, the particles of metal chalcogenides are preferred.

The metal chalcogenide mentioned above includes such preferred species as the oxide of titanium, tin, zinc, iron, tungsten, zirconium, hafnium, strontium, indium, cerium, yttrium, lanthanum, vanadium, niobium, or tantalum; the sulfide of cadmium, zinc, lead, silver, antimony, or bismuth; the selenide of cadmium or lead; and the telluride of cadmium. As other compound semiconductors, phosphide of zinc, gallium, indium, cadmium or the like; selenide of gallium-arsenic or copper-indium, sulfide of copper-indium, etc. are suitable.

The semiconductor for use in the present invention is preferably Si, $TiO_2$, $SnO_2$, $Fe_2O_3$, $WO_3$, ZnO, $Nb_2O_5$, CdS, ZnS, PbS, $Bi_2S_3$, CdSe, CdTe, GaP, InP, GaAs, $CuInS_2$ or $CuInSe_2$, more preferably $TiO_2$, $SnO_2$, $Fe_2O_3$, $WO_3$, ZnO, $Nb_2O_5$, CdS, PbS, CdSe, InP, GaAs, $CuInS_2$ or $CuInSe_2$, still more preferably $TiO_2$ or $Nb_2O_5$, most preferably $TiO_2$.

The semiconductor for use in the present invention may be a single crystal or a polycrystal. From conversion efficiency points of view, a single crystal is preferred but a polycrystal is preferred in terms of production cost, raw material availability, and energy payback time, among other factors.

The particle diameter of the above semiconductor particles is generally of the nm~μm order but the average particle diameter of primary particles as calculated as the diameter of a circle constructed from the projection image area is preferably 5~200 nm, more preferably 8~100 nm. Moreover, the average particle diameter of semiconductor particles (secondary particles) in the dispersion described hereinafter is preferably 0.01~100 μm. The particles may comprise an admixture of two or more kinds of particles differing in particle size distribution, although the average size of the smaller particles is preferably not more than 5 nm. For the purpose of scattering the incident light to improve the light capture rate, semiconductor particles having large diameters, for example particles measuring about 300 nm, may be included.

The production method of the above semiconductor particles is preferably the Sol-gel method described in Sakka Yasuo: "Science of the Sol-gel Method", Agne Shofu Sha (1998) and "Thin-film Coating Technology by the Sol-gel Method", Gijutu Johou Kyoukai (1995), among others, and the gel-sol method described in Sugimoto Tadao: "The Synthesis and Size/Shape Control of Monodispersed Particles by the Gel-Sol Method, a New Synthetic Technique, Materia, 35, 9 (1996), pp. 1012-1018. Moreover, the method developed by Degussa for preparing oxides by high-temperature hydrolysis of chlorides in an acid hydrogen salt can also be preferably used.

In the case where the above semiconductor particles are titanium oxide particles, any of the above sol-gel method, gel-sol method, and the method for high-temperature hydrolysis of a chloride in an acid hydrogen salt can be preferably used and, aside from these, the sulfuric acid method and chlorine method described in Seino Manabu: Titanium Dioxide-Properties and Application Technology (1997), Gihōdo Publishing can also be used. In addition, as versions of the sol-gel method, the method of Barb et al. [Journal of American Ceramics Society, 80, 12 (1997), p. 3157-3171] and the method of Barnside et al. [Chemical Materials, 10, 9, p. 2419-2425] can also be used.

Coating semiconductor particles onto a conductive support to construct the above semiconductor particles layer can be carried out not only by the method which comprises coating the conductive support with a dispersion or colloidal solution of semiconductor particles but also by the sol-gel method mentioned above. In consideration of the need for mass production of dye-sensitized solar cells, physical properties of a dispersion of semiconductor particles, and versatility of the conductive support, the wet film-forming technique is relatively advantageous. Typical wet film-forming techniques are the coating method and the printing method.

The preferred method for preparing the above dispersion of semiconductor particles includes not only the above-mentioned sol-gel method but also the grinding method involving the use of a mortar, the method involving the use of a mill for concurrent crushing and dispersing, and the method in which the semiconductor is synthesized in such a manner that the semiconductor synthesized is precipitated in a solvent and used as it is.

As the dispersion medium mentioned above, water or various organic solvents can be used. The organic solvent which can be used preferably includes methanol, ethanol, isopropyl alcohol, dichloromethane, acetone, acetonitrile, and ethyl acetate, among others. These may be used each independently or in a combination of two or more species. In dispersing, a polymer, a surfactant, an acid, or a chelating agent, for instance, may be used as a dispersion aid where necessary.

Referring to the above coating method, the application system includes the roller method, dip method, etc.; the metering system includes the air knife method, blade method, etc.; and the method by which the application and the metering can be done in the same site includes the wire bar method as described in Japanese Kokoku Publication Sho-58-4589, the slide hopper method, extrusion method, and curtain method as described in U.S. Pat. Nos. 2,681,294, 2,761,419, 2,761,791, etc., among others. As the technology utilizing universal machines, the spin-coating method and spray method are also useful. The wet printing method which can be preferably used includes not only the three major printing methods, viz. relief printing method, offset printing method and gravure printing method but also the intaglio printing method, rubber plate printing method, and screen printing method. The advantageous film-forming method is judiciously selected from among these methods according to the fluid viscosity and wet thickness.

The viscosity of the above dispersion of semiconductor particles should vary widely according to the kind and dispersiblity of semiconductor particles, the solvent species used, and additives such as the surfactant, binder and so on. For high-viscosity (for example, 0.001~50 Pa·s) dispersions, the extrusion method, casting method, and screen printing method, among others, are preferred. For low-viscosity (for example, 0.01 Pa·s or less) dispersions, the slide hopper method, wire bar method, or spin coating method is preferred, for a uniform film can be constructed by these methods. Incidentally, provided that the coating amount is fairly large, the extrusion method can be used even when the viscosity of the dispersion is low. Thus, the optimum wet film-forming method can be judiciously selected according to the viscosity of the dispersion, coating amount, the support used, coating speed, and other variables.

The above-mentioned layer of semiconductor particles need not be a single layer but dispersions of semiconductor particles varying in particle diameter may be applied in a plurality of layers or coating layers containing semiconductor particles of different kinds (or binders and/or additives of different kinds) may be applied in a plurality of layers. Multi-layer coating is effective in cases where a single coat is deficient in film thickness. For multi-layer coating, the extrusion method or the slide hopper method is suitable. Moreover, for multi-layer coating, a plurality of layers may be applied in one operation or applied by recoating in a few to more than 10 layers. For sequential recoating, the screen printing method can also be used with advantage.

Generally speaking the greater the thickness of the layer of semiconductor particles (the same as the thickness of the photosensitive layer) is, the greater is the amount of the dye carried per unit projection image area and, therefore, the higher is the light capture rate. However, since the diffusion distance of generated electrons is increased, the loss due to charge recombination is also increased. Therefore, the preferred thickness of the layer of semiconductor particles is 0.1~100 μm. For use in a dye-sensitized solar cell, the thickness of the layer of semiconductor particles is preferably 1~30 μm, more preferably 2~25 μm. The coating amount of semiconductor particles per square meter of the support is preferably 0.5~400 g, more preferably 5~100 g.

After coating the conductive support with the above semiconductor particles, the coated support is preferably heat-treated in order to insure electronic contact between semiconductor particles and increase the film strength and adhesion to the support. The preferred temperature for this heat treatment is not lower than 40° C. but lower than 700° C. The more preferred temperature is not lower than 100° C. but not over 600° C. The heating time is about 10 minutes to about 10 hours. When a support having a low melting point or softening point, such as a polymer film, is used, a high-temperature treatment may induce degradation of the support and should, therefore, be avoided. From the cost point of view, too, the heat-treatment temperature is preferably as low as possible. The treatment at a reduced temperature can be made feasible by the combined use of the above-mentioned small-sized semiconductor particles not over 5 nm in diameter or a heat treatment in the presence of a mineral acid.

After the above heat treatment, for the purpose of increasing the surface area of semiconductor particles or improving the purity in the neighborhood of the semiconductor particles to enhance the injection efficiency of electrons from the dye into the semiconductor particles, chemical plating with an aqueous solution of titanium tetrachloride or electrochemical plating with an aqueous solution of titanium trichloride may be performed.

It is preferable that the above semiconductor particles have large surface areas in order that they may adsorb a large amount of the dye. For this purpose, the surface area of semiconductor particles in a layer as coated on the support is preferably not less than 10 times the projection image area, more preferably not less than 100 times the projection image area. The upper limit is usually about 1000 times.

The dye for use in the photosensitive layer of the dye-sensitized solar cell according to the present invention should be a dye which absorbs in various visible and infrared regions of the spectrum and preferably has an interlock group for locking it to the semiconductor layer, such as a carboxyl group, an alkoxy group, a hydroxyl group, a hydroxyalkyl group, a sulfo group, an ester group, a mercapto group, a phosphonyl group, or the like within the molecule. The interlock group provides an electrical connection which facilitates the mobility of electrons between the dye in excited state and the conduction band of the semiconductor. The preferred dye of the above-mentioned type includes ruthenium bipyridine dyes, azo dyes, quinone dyes, quinoneimine dyes, quinacridone dyes, squarylium dyes, cyanine dyes, merocyanine dyes, triphenylmethane dyes, xanthene dyes, porphyrin dyes, phthalocyanine dyes, perylene dyes, indigo dyes, and naphthalocyanine dyes, among others. Furthermore, in the present invention, two or more kinds of dyes may be blended to broaden the wavelength range of photo-electric energy conversion as much as possible and, at the same time, enhance the conversion efficiency. In this case, it is preferable to judiciously select the dyes to be blended and the blending ratio so as to match the wavelength range and intensity distribution of the light source.

Regarding the method of causing the dye to be adsorbed on the above semiconductor particles, the preferred method comprises dipping the well-dried conductive support having a layer of semiconductor particles in a solution of the dye or coating the layer of semiconductor particles with a solution of the dye. The dye solution is a solvent solution of the above dye which functions as a photosensitizer. As the former method, the immersion method, dip method, roller method and airknife method are suitable. In the case of the immersion method, adsorption of the dye may be effected at room temperature or, as described in Japanese Kokai Publication Hei-07-249790, can be carried out under heating at the reflux temperature. Regarding the latter coating method, the wire bar method, slide hopper method, extrusion method, curtain method, spin method, spray method, etc. are preferred. As to the printing method, the relief, offset, gravure, and screen printing methods are preferred. The solvent can be judiciously selected according to the solubility of the dye and the preferred solvents are alcohols such as methanol, ethanol, t-butyl alcohol, benzyl alcoholetc.; nitrites such as acetonitrile, propionitrile, 3-methoxypropionitrile, etc.; nitromethane; halogenated hydrocarbons such as dichloromethane, dichloroethane, chloroform, chlorobenzene, etc.; ethers such as diethyl ether, tetrahydrofuran, etc.; dimethyl sulfoxide; amides such as N,N-dimethylformamide, N,N-dimethylacetamide, etc.; N-methylpyrrolidone; 1,3-dimethylimidazolidinone; 3-methyloxazolidinone; esters such as ethyl acetate, butyl acetate, etc.; carbonic esters such as diethyl carbonate, ethylene carbonate, propylene carbonate, etc.; ketones such as acetone, 2-butanone, cyclohexanone, etc.; and hydrocarbons such as hexane, petroleum ether, benzene, toluene, etc.; inclusive of mixtures of such solvents. These may be used each independently or as a mixture of two or more species.

Referring to the viscosity of the above dye solution, just as it is the case with formation of the layer of semiconductor particles, the extrusion method and various printing methods are suitable for high-viscosity (for example, 0.001~50 Pa·s) solutions, while the slide hopper method, wire bar method, and spin method are suitable for low-viscosity (for example, 0.1 Pa·s or less) solutions. In any case, a uniform film can be constructed. Thus, the optimum dye-adsorbing method can be judiciously selected according to the viscosity of the dye-coating solution, coating amount, kind of conductive support, and coating speed, among other variables. The time required for adsorption of the applied dye is preferably as short as possible in consideration of mass production needs.

Since the presence of the unadsorbed dye poses an external disturbance to device performance, it is preferably removed by washing immediately after the adsorption procedure. The preferred procedure involves the use of a wet cleaning tank employing an organic cleaning solvent such as a polar solvent, e.g. acetonitrile, or an alcoholic solvent. To increase the adsorption amount of dye, a heat-treatment is preferably carried out before adsorption. To avoid adsorption of water on the surface of semiconductor particles after heat treatment, it is recommendable to cause the dye to be adsorbed promptly at a temperature between 40° C. and 80° C. without letting the work cool to room temperature.

The total level of use of the above dye is preferably 0.01~100 mmol per unit surface area (1 m$^2$) of the conductive support. Moreover, the amount of adsorption of the dye relative to the semiconductor particles is preferably 0.01~1 mmol per gram of the semiconductor particles. In this manner, a sufficient sensitizing effect on the semiconductor can be obtained. If the amount of the dye is too small, the sensitizing effect will be insufficient, while an excessive use of the dye will cause a floatation of the dye not adsorbed on the semiconductor to decrease the sensitizing effect. To reduce the interaction of dye particles, such as association, the dye and a colorless hydrophobic compound may be coadsorbed on the semiconductor particles. The preferred hydrophobic compound for such coadsorption is a carboxyl group-comprising steroid compound (for example, chenodeoxycholic acid), to mention an example. An ultraviolet absorber may also be used in combination.

Referring to the semiconductor layer having a photosensitive substance mentioned above, the surface of the semiconductor particles may be treated with an amine or an acid compound following adsorption of the dye in order to promote removal of the superfluous dye. The amine which can be preferably used includes pyridine, 4-t-butylpyridine, and polyvinylpyridine, among others. The acid compound which can be preferably used includes formic acid, acetic acid, among others. Where the amine or acid compound is a liquid, it can be used as it is but otherwise it may be dissolved in an organic solvent before using.

(3) The Charge Transfer Layer

The above charge transfer layer, which has the constitution described above, can improve photo-electric energy conversion efficiency and effectively prevent the leakage of the electrolyte by impregnating a porous support with the liquid electrolyte in the case where it is comprised of a liquid electrolyte. As the porous support which can be used for this purpose, a filter (membrane filter) or the separator or nonwoven cloth for primary or secondary batteries can be preferably used. Particularly when the porous support has through-voids extending in the direction normal to the surface, the porous support itself does little interfere with movement of the redox pair so that a high photo-electric energy conversion efficiency can be obtained.

The preferred material of the filter for use as the above porous support includes glass fiber; polyolefins such as polypropylene, polyethylene, etc.; and polyesters such as polyethylene terephthalate, among others.

The preferred material of the separator or nonwoven cloth for use as the above porous support includes polyolefins such as polypropylene, polyethylene, etc.; polyesters such as polyethylene terephthalate etc. polyamides; polyphenylene sulfide; vinyon (copolymer of polyvinyl chloride and vinyl acetate); polyimides; and vinylon (acetalized polyvinyl alcohol); among others. Separators or nonwoven cloths made of these materials can be used each independently or in a composite form of two or more species. The term "composite nonwoven cloth" is used herein to mean a blend-stretched nonwoven fabric produced by blending two kinds of materials and subjecting the blend to melt-spinning/drawing or a core-sheath type nonwoven fabric produced by heat-fusion of a composite fiber containing a core made of one of two materials and a sheath made of the other material surrounding the core (a conjugate fiber). For example, a heat-fused type nonwoven fabric containing a high-melting polypropylene core and a low-melting polyethylene sheath is well known.

The thickness of the above porous support is dictated by the planar spacing between the photosensitive layer and the counter electrode. Generally speaking, however, the thickness of the porous support is preferably not more than 1 mm. If the thickness of the porous support exceeds 1 mm, the distance of movement of the redox pair in the charge transfer layer is extended and the electron donation-acceptance reaction mediated by the redox pair becomes rate-determining so that the photo-electric energy conversion efficiency tends to be decreased.

Omission of the spacing between the above photosensitive layer and counter electrode would mean to lose the charge transfer layer region where the mechanism of retention by the porous support does not function and this result should contribute to prevention of leakage and enhancement of reliability. However, causing the two electrodes to be pressed forcefully against each other in assembling to eliminate the air space between the photosensitive layer and counter electrode would mechanically damage the photosensitive layer and counter electrode to lower the photo-electric energy conversion efficiency. Therefore, it is preferable to provide a clearance of at least 1 μm between the photosensitive layer and counter electrode to thereby prevent mechanical damage to said photosensitive layer and counter electrode. Thus, the thickness of the porous support to be disposed between the photosensitive layer and counter electrode is preferably not less than 1 μm.

In case a porous support is used for providing a charge transfer layer in the dye-sensitized solar cell of the present invention, the porous support is preferably made of a porous material having a porosity (percentage of air space) of 30-80%. If the porosity is less than 30%, the effect of the porous support to block movement of redox pairs is increased and the electron donation-acceptance reaction mediated by the redox pair becomes rate-determining so that the phtoelectric conversion efficiency tends to be decreased. If the porosity exceeds 80%, the large pore size leads to a reduction in the capacity of the support to hold the electrolyte solution by capillary phenomena, with the result that no sufficient leak-preventive effect may be obtained.

(4) The Counter Electrode

The above counter electrode functions as a positive electrode when the photo-electric device is assembled into a dye-sensitized solar cell. Like the conductive support mentioned above, the counter electrode may be a single-layer counter electrode made of a conductive material or of a counter-electrode conducting layer and a supporting substrate. The conductive material which can be preferably used for the counter electrode conducting layer includes various metals such as platinum, gold, silver, copper, aluminum, rhodium, indium, etc.; carbon; and conductive metal oxides such as indium-tin composited oxide, fluorine-doped tin oxide, and so forth. The preferred supporting substrate of the counter electrode is a glass substrate or a plastic substrate, and the above-mentioned conductive material is applied onto the substrate by coating or vapor deposition. The preferred thickness of the counter electrode conducting layer is 3 nm~10 μm. When the counter electrode conducting layer is made of a metal, its thickness is preferably not more than 5 μm, more preferably 5 nm~3 μm.

Light may be incident on the device from whichever of the above conductive support and counter electrode or both and at least one of the conductive support and counter electrode should be substantially transparent in order that the incident light may reach the photosensitive layer. From the standpoint of improving the power generation efficiency, it is preferred to use a transparent conductive support and let the light be incident from the conductive support side. In this mode, the counter electrode is preferably one having the property to reflect light. As the counter electrode in this mode, a glass or plastic substrate carrying a vapor-deposited metal or conductive oxide film or a metallic thin-film is preferably used.

Two alternative procedures are available for disposing the counter electrode, viz. (a) superimposition on the charge transfer layer formed in advance and (b) disposition on the photosensitive layer through a spacer followed by filling the gap with an electrolyte solution. In the case of (a), a conductive material is directly coated, plated, or vapor-deposited (PVD, CVD) on the charge transfer layer or, as an alternative, the conductive layer side of a substrate having a conductive layer is laminated on the layer. In the case of (b), the counter electrode is constructed and fixed in position on the photosensitive layer through a support (spacer) and the open edge of the resulting assemblage is immersed in an electrolyte solution to let the solution filter into the air gap between the photosensitive layer and the counter electrode by capillary phenomena or under reduced pressure. Furthermore, it is preferable to use metal leads for lowering the resistance of the counter electrode, particularly when the counter electrode is transparent, just as it is the case with the conductive support. The preferred raw material and method of installation of metal leads and the depression of incident light quantity due to installation of metal leads are the same as described for the conductive support.

(5) Other Layers

In addition to the (1) conductive support, (2) photosensitive layer, (3) charge transfer layer, and (4) counter electrode mentioned above, the dye-sensitized solar cell of the present invention may have functional layers, such as a protective layer and an antireflection layer, on one side or both sides of the conductive support and the counter electrode functioning as electrodes. When such functional layers are to be formed in a plurality of layers, the concurrent multi-layer coating method or the sequential coating method can be employed, although the concurrent multi-layer coating method is preferred from productivity points of view. Regarding the concurrent multi-layer coating method, the slide hopper method and the extrusion method are suitable from productivity and coated film uniformity points of view. For the formation of these functional layers, the vapor deposition method or the lamination method can be utilized according to the respective materials. Moreover, to prevent short-circuiting between the counter electrode and the conductive support, a dense semiconductor thin-layer may be constructed in advance as an undercoating layer between the conductive support and photosensitive layer. The material for such an undercoating layer is preferably $TiO_2$, $SnO_2$, $Fe_2O_3$, $WO_3$, ZnO and/or $Nb_2O_5$, more preferably $TiO_2$. The undercoating layer can be constructed by the spray pyrosis method described in Electrochimi. Acta, 40 (1995) p. 643~652. The preferred thickness of the undercoating layer is not less than 5 nm and not more than 1000 nm. The more preferred thickness is not less than 10 nm and not more than 500 nm.

The modular structure of the dye-sensitized solar cell comprising the photo-electric energy conversion device of the present invention is now described.

The dye-sensitized solar cell of the present invention may be implemented in basically the same modular construction as the conventional solar cell. The solar cell module is generally so constructed that the cells are formed on a metal, ceramic or other supporting substrate and covered with a resin filler or a protective glass and so adapted to allow sunlight to be incident from the side of the module which is opposite to the supporting substrate. It may also be so arranged that the supporting substrate is made of reinforced glass or other transparent material and the cells are assembled thereon to let sunlight be incident from the transparent substrate side. More particularly, while the modular structures called superstrate type, substrate type, and potting type and the substrate-integral modular structure used in amorphous silicon solar cells, among others, are known, any of these modular structures can be selectively used according to the intended use, location of use, and environment.

The representative superstrate type or substrate type modular structure comprises a plurality of cells arranged at a constant pitch between supporting substrates which are transparent and antireflection-treated either on one side or both sides, with the adjacent cells being interconnected with metal leads, flexible wiring or the like and a current collector being disposed peripherally so that the generated electric power can be taken out. For the protection of cells and enhancement of current collection efficiency, depending on the intended use, various kinds of plastics such as, for example, ethylene vinyl acetate (EVA), can be used in the form of film or resin filler between the substrate and cells. Furthermore, when the solar cell is to be used in a location where its surface need not be covered with a hard material, for example a location not appreciably exposed to external shocks, the supporting substrate on one side may be omitted by constructing the surface protective layer using a transparent plastic film or curing the above resin filler to provide a protective function. For hermetic sealing of the interior structure and insuring the necessary rigidity of modules, the marginal region of the supporting substrate is fixedly secured in the manner of a sandwich by means of a metallic frame and the gap between the supporting substrate and the frame is hermetically sealed with a sealant. Moreover, by using flexible materials for the cell itself, supporting substrate, filler, and sealant, a solar cell can be constructed on a curved plane.

The solar cell module of the above superstrate type can, for example, be constructed by a process which comprises transferring a front substrate delivered from a substrate supply device by means of a belt conveyor or the like and sequentially laminating cells, a sealant, cell-to-cell interconnecting leads, a rear-side sealant, etc. thereon, setting a rear substrate or cover in position, and finally setting a frame in the marginal position.

On the other hand, in the case of substrate type, the supporting substrate paid out from a substrate supply device is transferred by means of a belt conveyor or the like and, in the course of travel, cells, cell-to-cell interconnecting leads, and sealant are sequentially laminated together on the substrate. Then, a front cover is superimposed and a frame is set in the peripheral edge to complete a modular structure.

The substrate-integrated modular structure of the photo-electric device is now described in detail referring to FIG. 6. The structure illustrated in FIG. 6 is a modular structure of cells formed on one side of a transparent substrate, each of the cells comprising a transparent conductive layer, a dyed $TiO_2$-comprising photosensitive layer, a charge transfer layer, and a counter electrode conducting layer as a modular unit, with an antireflection layer (not shown) being disposed on the other side of the transparent substrate. In this construction, the area ratio of the photosensitive layer (the area ratio as viewed from the light-incident substrate side) is preferably as large as practicable in order to insure an enhanced incident light utilization efficiency.

In the modular construction illustrated in FIG. 6, the desired construction can be implemented by patterning the transparent conductive layer, photosensitive layer, charge transfer layer, counter electrode, etc. three-dimensionally at constant pitches using the semiconductor processing technologies such as selective plating, selective etching, CVD, PVD, etc., pattern coating, broad-band coating and subsequent laser scribing, plasma CVM (cf. Solar Energy Materials and Solar Cells, 48, p. 373-381, for instance), and mechanical techniques such as grinding.

The other component materials and assembling processes are described below.

The sealant mentioned above which can be preferably used includes curable resins such as radical-curable resins, ion-curable resins, and thermosetting resins mentioned above. Depending on the intended use, liquid EVA (ethylene vinyl acetate), filmy EVA, vinylidene fluoride copolymer-acrylic resin mixture, etc. can also be used. The clearance between the marginal part of the unit module and the peripheral edge surrounding frame is preferably sealed with a highly weather-resistant/moisture-proof sealant. Moreover, a transparent filler may be mixed into the sealant for improved strength and light transmittance.

For securing the above sealant on the cell, a technique tailored to the physical properties of the material is used. In the case of a film-shaped material, roll compression followed by heat fusion, vacuum compression followed by heat fusion, etc. is used. In the case of a liquid or pasty material, such various techniques as roll coating, bar coating, spray coating, and screen printing can be utilized.

When a flexible material such as PET or PEN, for instance, is used as the above supporting substrate, the supporting substrate can be paid out from a roll, the cells be constructed thereon, and the sealing layer be then laminated continuously by the above method, whereby high productivity can be obtained.

In the above solar cell, in order to improve the power generation efficiency, the surface of the substrate (generally a reinforced glass sheet) on the side where sunlight is incident on the module is subjected to an anti-reflection treatment. The antireflection method which can be used includes the method which comprises laminating an antireflection film and the method which comprises constructing an antireflection layer by coating.

Moreover, the efficiency of utilization of incident light can be enhanced by treating the cell surface by the grooving technique or the texturing technique.

To enhance the power generation efficiency of the above solar cell, it is of the foremost importance to admit sunlight into the modular structure without incurring losses and, therefore, it is also important to insure that the light having reached the inner part through the photo-electric layer will be reflected back to the photo-electric layer side with good efficiency. The method of enhancing light reflectance includes the method which comprises polishing the supporting substrate surface mirror-smooth and performing vapor-deposition or plating with Ag or Al, for instance, the method which comprises providing an Al—Mg or Al—Ti alloy layer as a reflection layer in the lowermost part of the cell, and the method which comprises constructing a textured structure in the lowermost layer by an annealing treatment.

Moreover, in order to improve the power generation efficiency, it is important to reduce the cell-to-cell connection resistance for suppressing internal voltage drops. The general method of connecting a cell to the adjacent cell includes wire bonding and interconnection with a conductive flexible sheet, but the method which comprises using a conductive self-adhesive tape or a conductive adhesive to secure the cells fixedly in position and, at the same time, to establish an electrical connection between the cells and the pattern-coating method which comprises applying a conductive hot-melt material in desired locations can also be employed.

In the case of a solar cell comprising a flexible support such as a polymer film, the photo-electric cell can be constructed by the method which comprises paying out a support from a roll and sequentially construct cells thereon in the above-mentioned manner, cutting the resulting assemblage to desired size, and sealing the peripheral edges with a flexible, moisture-proof material. Moreover, the solar cell can be made into the modular structure called SCAF as described in Solar Energy Materials and Solar Cells, 48, p. 383-391. In addition, the solar cell comprising a flexible support can be fixedly secured onto a glass having a curved surface and used as such. Thus, in accordance with the present invention, solar cells having various forms and functions can be constructed according to the intended use and environment of use.

The dye-sensitized solar cell according to the present invention, which has the constitution described above, shows high safety and increased ionic conductivity, exhibiting excellent cell performance and, therefore, is suited for a variety of uses.

BEST MODE FOR CARRYING OUT THE INVENTION

The following examples are further illustrative of the present invention. It should, however, be understood that the following examples are by no means limitative of the scope of the present invention but many changes and modifications can be made without departing from the spirit of the present invention.

(Counter Electrode)

An FTO substrate [VZ019 (glass with tin oxide film), product of Nippon Sheet Glass Company, Ltd.] was subjected to Pt sputtering for use as the counter electrode. The thickness of the Pt film was 300 nm.

(Semiconductor Electrode)

A coating solution was prepared by mixing 0.4 g of high-purity titanium oxide (Super Titania F-6, product of Showa Titanium Co.), 2 mL of water, 0.12 g of polyethylene glycol (mol. wt. 500,000; product of Woko Pure Chemical Ind.), and 0.04 g of Marpolose (60 MP-50, product of Matsumoto Yushi-Seiyaku Co., Ltd.) uniformly. This coating solution was coated on an FTO substrate (VZ019, glass with tin oxide film, product of Nippon Sheet Glass Company, Ltd.) by the doctor blade method, dried at 100° C., and further heat-treated at 450° C. for 1 hour to prepare a porous $TiO_2$ thin-film electrode (semiconductor electrode) This electrode was dipped in an ethanolic solution of $RuN_3$ dye (concentration $3.0 \times 10^{-3}$ mol/L) for 10 hours to give a semiconductor electrode on which the $RuN_3$ dye (sensitizing dye) had been adsorbed. The $RuN_3$ dye mentioned above is Ruthenium 535 [product of Solaronix Co.; cis-bi(isothiocyanate)bis(2,2'-bi-pyridyl-4,4'-dicarboxylate)-ruthenium(II)].

The thickness of the semiconductor layer (porous $TiO_2$ thin-film) of the semiconductor electrode was 10 μm.

(Charge Transfer Layer)

Electrolyte: An electrolyte solution composed of lithium iodide (concentration 0.1 mol/L), iodine (concentration 0.05 mol/L, and 1,2-dimetyl-3-propylimidazole iodide (concentration 0.3 mol/L) and t-butylpyridine (concentration 0.5 mol/L), and 1-methyl-3-ethylimidazoliumdicyanamide (briefly, EMImDCA) was used. In Comparative Example, 1-methyl-3-ethylimidazolium bis[trifluoromethane sulfonyl]imide (briefly, EMImTFSI) was used in lieu of EMImDCA.

The above counter electrode, semiconductor electrode, and charge transfer layer were disposed as shown in FIG. 1 (cell construction diagram) and the assemblage was sealed with a sealant (Himilan, product of Du Pont Mitsui Polychemicals Co, Ltd.)) to obtain a dye-sensitized solar cell. The gap between the counter electrode and semiconductor electrode was 20 μm. The electrode area was 0.2 $cm^2$ (4×5 mm).

The cell performance measurements of the dye-sensitized solar cell were carried out as follows. The counter electrode and semiconductor electrode of the dye-sensitized solar cell were connected to a current-voltage meter consisting of an ammeter [487, manufactured by Keithley Co.], a function generator [HP-105, manufactured by Hokuto Denko Co., Ltd.] and a potentiostat [HA-5016, manufactured by Hokuto Denko Co., Ltd.] with leads equipped with crocodile mouth clips. Then, the semiconductor electrode substrate side of the dye-sensitized solar cell was exposed to a mimic sunlight (light intensity I: 100 mW/$cm^2$) obtained by filtering the light of a 500 W xenon lamp (manufactured by Ushio Inc.) through a spectral filter (AM 1.5, product of Oriel Co.). The electricity generated by this dye-sensitized solar cell was measured with the above current-voltage meter. From the result, the open-circuit voltage Voc, short-circuit current density Jsc, and fill factor FF were determined and the energy conversion efficiency η was calculated by means of the following equation.

$$\eta = 100 \times Voc \times Jsc \times FF/I \quad (1)$$

EXAMPLE

The energy conversion efficiency η in the case where EMImDCA was used in the charge transfer layer was:
Energy conversion efficiency η=1.1%

Comparative Example

The energy conversion efficiency η in the case where EMImTFSI was used in the charge transfer layer was:
Energy conversion efficiency η=0.4%

The invention claimed is:

1. A dye-sensitized solar cell comprising a photosensitive layer, a charge transfer layer including an electrolyte, and a counter electrode in this order,
   wherein an ionic substance having an anion represented by the following general formula (1) is used as a component material of the electrolyte in the charge transfer layer:

(1)

wherein X represents at least one element selected from among B, Al, Si, P, As, and Se; $M^1$ and $M^2$ are the same or different and each represents an organic linking group; Q represents an organic group; a is an integer of not less than 1, and b, c, and d each is an integer of not less than 0; and
the ionic substance is a molten salt which can stably retain a liquid state within the temperature range of room temperature to 80° C.

* * * * *